United States Patent
Park et al.

(10) Patent No.: US 11,956,645 B2
(45) Date of Patent: Apr. 9, 2024

(54) DETECTION OF HIGH SPEED TRAIN SCENARIO AND INDICATION OF HIGH SPEED TRAIN (HST) MODE

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Kiran Venugopal, Raritan, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/148,476

(22) Filed: Jan. 13, 2021

(65) Prior Publication Data

US 2021/0306864 A1 Sep. 30, 2021

Related U.S. Application Data

(60) Provisional application No. 62/994,180, filed on Mar. 24, 2020.

(51) Int. Cl.
*H04W 16/28* (2009.01)
*H04B 17/318* (2015.01)
*H04B 17/364* (2015.01)
*H04W 24/08* (2009.01)

(52) U.S. Cl.
CPC .......... *H04W 16/28* (2013.01); *H04B 17/318* (2015.01); *H04B 17/364* (2015.01); *H04W 24/08* (2013.01)

(58) Field of Classification Search
CPC ..... H04W 16/28; H04W 24/08; H04W 4/027; H04B 17/318; H04B 17/364; H04B 7/088; H04B 7/0617
See application file for complete search history.

(56) References Cited

U.S. PATENT DOCUMENTS

2005/0020203 A1 1/2005 Losh et al.
2016/0338002 A1* 11/2016 Yiu .................. H04W 8/22
2016/0360537 A1* 12/2016 Palenius ............. H04W 72/085
(Continued)

FOREIGN PATENT DOCUMENTS

EP 3273617 A1 1/2018
KR 20180118070 A 10/2018
WO 2013181831 A1 12/2013

OTHER PUBLICATIONS

International Search Report and Written Opinion—PCT/US2021/023119—ISA/EPO—dated Jun. 9, 2021.

*Primary Examiner* — Peter P Chau
(74) *Attorney, Agent, or Firm* — Seyfarth Shaw LLP

(57) ABSTRACT

A method of wireless communication by a base station detects a UE is in a high speed train scenario. The method also instructs the UE to enter a high speed train (HST) mode when the UE is detected to be in the high speed train scenario. The method further performs beam management in accordance with the HST mode. A UE (user equipment) for wireless communication detects when the UE is in high speed train scenario. The UE also reports the high speed train scenario to a base station and then receives instructions from the base station to enter a high speed train (HST) mode. The UE performs beam management in accordance with the HST mode.

16 Claims, 6 Drawing Sheets

(56) References Cited

U.S. PATENT DOCUMENTS

| | | | |
|---|---|---|---|
| 2017/0099175 A1* | 4/2017 | Tian | H04L 27/2647 |
| 2017/0230883 A1* | 8/2017 | Dang | H04W 36/00835 |
| 2018/0020330 A1* | 1/2018 | Li | H04L 27/2685 |
| 2018/0049078 A1* | 2/2018 | Yang | H04W 36/36 |
| 2018/0167236 A1* | 6/2018 | Li | H04L 25/0204 |
| 2018/0167856 A1* | 6/2018 | Li | H04W 36/0088 |
| 2020/0128467 A1* | 4/2020 | Gao | H04W 36/305 |
| 2020/0288368 A1* | 9/2020 | Hong | H04W 64/006 |
| 2022/0095195 A1* | 3/2022 | Ning | H04W 64/006 |

* cited by examiner

DETECTION OF HIGH SPEED TRAIN SCENARIO AND INDICATION OF HIGH SPEED TRAIN (HST) MODE

CROSS-REFERENCE TO RELATED APPLICATION

The present application claims the benefit of U.S. Provisional Patent Application No. 62/994,180, filed on Mar. 24, 2020, and titled "DETECTION OF HIGH SPEED TRAIN SCENARIO AND INDICATION OF HIGH SPEED TRAIN (HST) MODE," the disclosure of which is expressly incorporated by reference herein in its entirety.

BACKGROUND

Technical Field

The present disclosure relates generally to wireless communications, and more particularly to detecting a high speed train (HST) scenario and indicating a high speed train (HST) mode.

INTRODUCTION

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Wireless communications should be able to cover scenarios where a UE is travelling on a high speed train, such as a train moving with a speed over 300 km/h. For sub-6 GHz systems (e.g., LTE, NR FR1 (new radio frequency one), etc.), the single frequency network (SFN) method is typically considered. For millimeter wave systems (e.g., NR FR2 (new radio frequency two)), a more advanced method is employed due to the use of analog beamforming. In other words, beam management for the high speed train scenario is not the same as beam management for the normal UE scenario. Other wireless communication techniques may also differ in high speed scenarios.

SUMMARY

In some aspects of the present disclosure, a method of wireless communication by a user equipment (UE) may receive instructions from a base station to enter a high speed train (HST) mode. The method may also perform beam management in accordance with the HST mode.

In some aspects of the present disclosure, a method of wireless communication by a base station may detect a UE (user equipment) is in a high speed train scenario. The method may also instruct the UE to enter a high speed train (HST) mode when the UE is detected to be in the high speed train scenario. The method may further perform beam management in accordance with the HST mode.

In another aspect of the present disclosure, an apparatus for wireless communications performed by a user equipment (UE), includes a processor and memory coupled with the processor. Instructions stored in the memory are operable, when executed by the processor, to cause the apparatus to receive instructions from a base station to enter a high speed train (HST) mode. The apparatus may also perform beam management in accordance with the HST mode.

In another aspect of the present disclosure, an apparatus for wireless communications performed by a base station, includes a processor and memory coupled with the processor. Instructions stored in the memory are operable, when executed by the processor, to cause the apparatus to detect a UE (user equipment) is in a high speed train scenario. The apparatus may also instruct the UE to enter a high speed train (HST) mode when the UE is detected to be in the high speed train scenario. The apparatus may further perform beam management in accordance with the HST mode.

The described techniques relate to improved methods, systems, devices, and apparatuses that support random access procedures for non-terrestrial networks. Generally, the described techniques provide for a wireless communications system that may be a non-terrestrial network, which may include a base station (e.g., a gateway), a user equipment (UE), and a satellite in wireless communications with the base station and the UE, among other components. In some cases, the base station may be integrated or located on board the satellite.

Some examples of the method, apparatuses, and non-transitory computer-readable medium described herein may further include operations, features, means, or instructions for generating a configuration for the UE including a reference signal (RS) periodicity, an indication of a symbol of a slot, and an indication of frequency resources for the upstream transmission, and transmitting the configuration to the UE during a connection procedure with the UE.

BRIEF DESCRIPTION OF THE DRAWINGS

So that features of the present disclosure can be understood in detail, a more particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
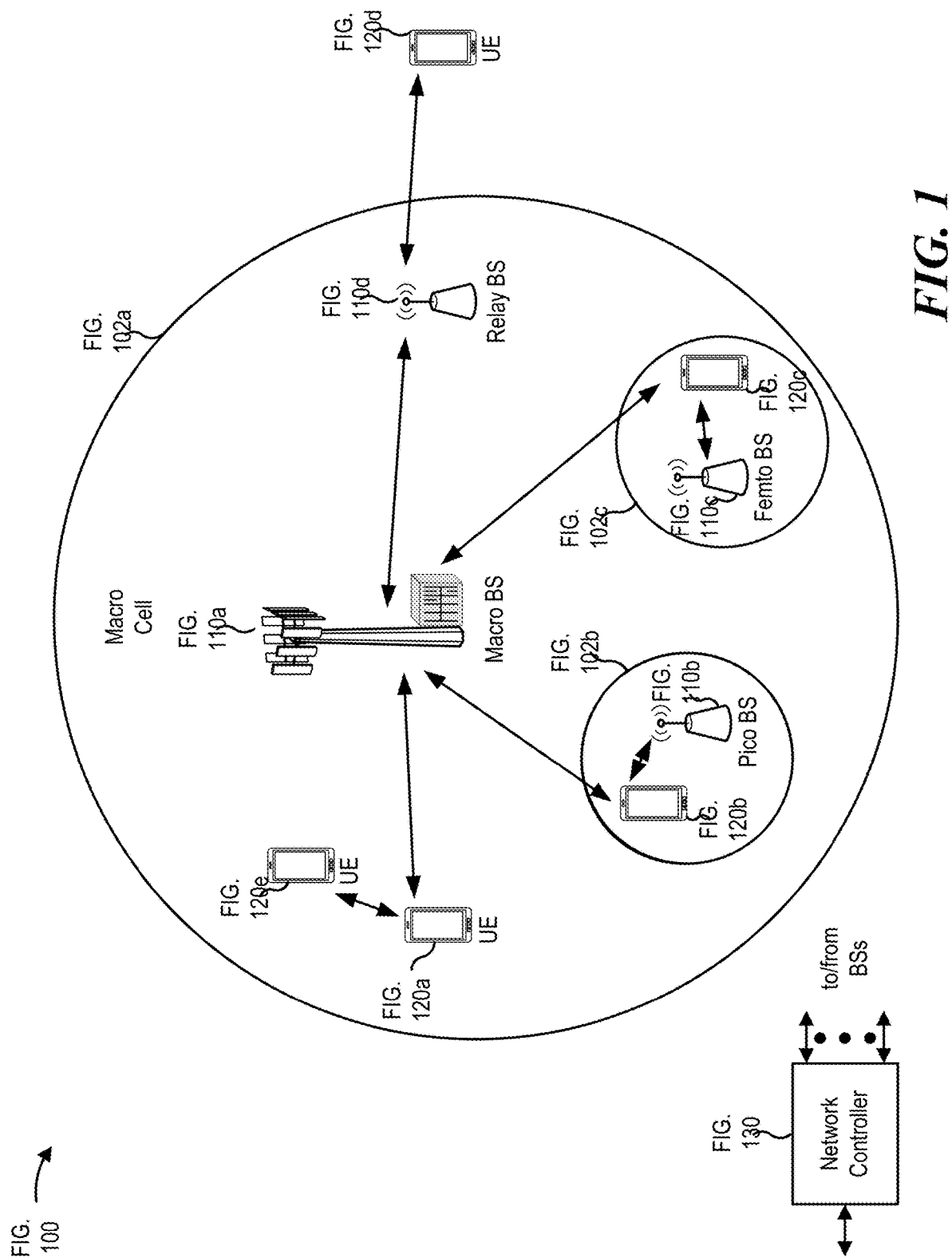
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As described above, wireless communications may occur in scenarios where a UE is travelling on a high speed train, such as a train moving with a speed over 300 km/h. For sub-6 GHz systems (e.g., LTE, NR FR1 (new radio frequency range one), etc.), the single frequency network (SFN) method is typically considered. In the SFN method, multiple transmit receive points (TRPs) transmit the same data on the same frequency and time resources, without analog beamforming.

For millimeter wave systems (e.g., NR FR2 (new radio frequency range two)), a more advanced method is employed due to the use of analog beamforming. Beam management is specified for NR FR2. Beam management methods have been well developed for normal FR2 deployment scenarios. However, the normal beam management methods for normal scenarios may not be able to be applied to the high speed train scenario. For example, analog beam determination based on beam sweeping (e.g., a current solution) may not work due to the UE's high speed. According to aspects of the present disclosure, beam management methods as well as other techniques specific to high speed scenarios may be triggered when a UE is in a high speed scenario.

FIG. 1 is a diagram illustrating a network 100 in which indication of a high speed train mode may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
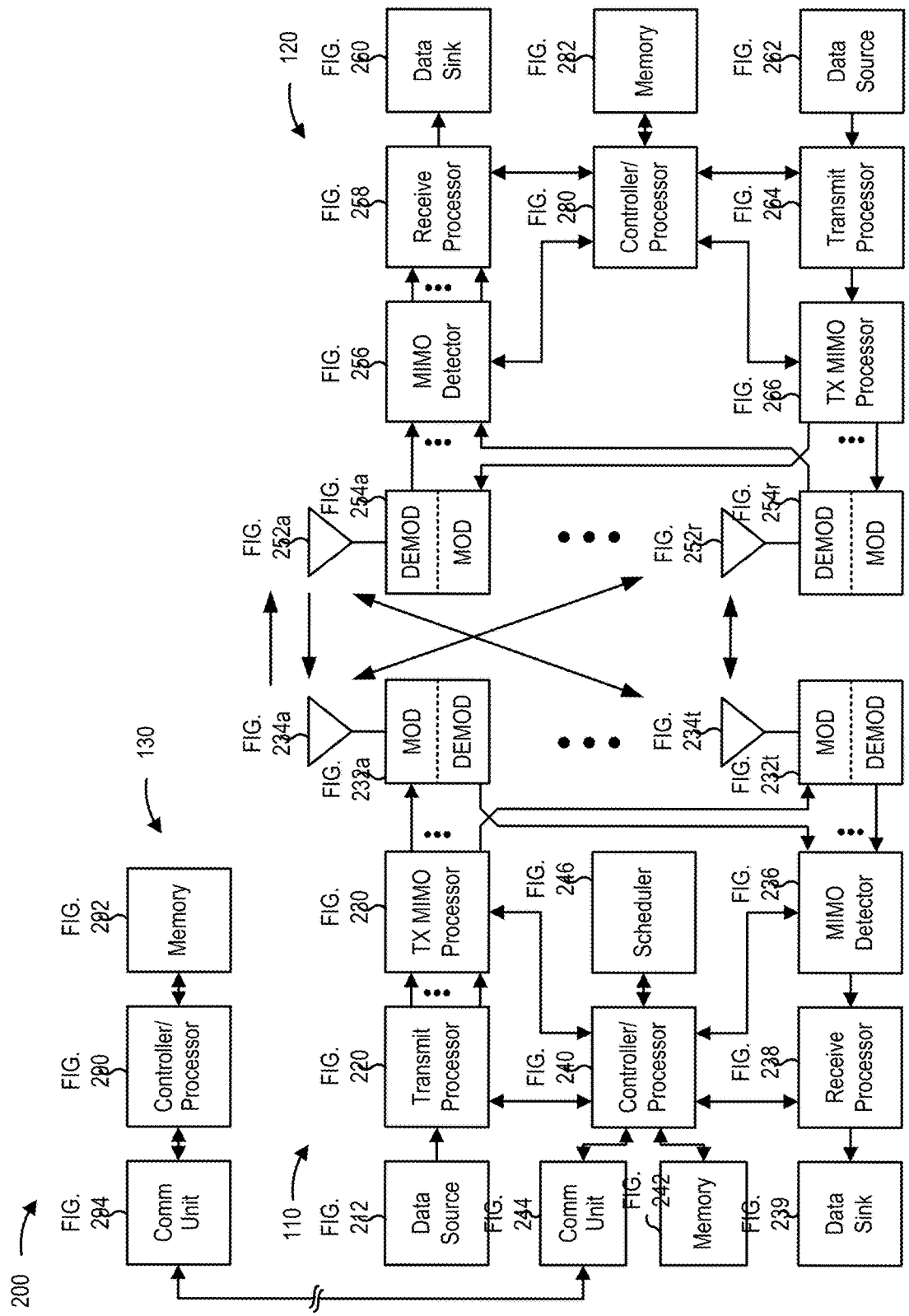
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 240 of base station 110, controller/processor 280 of UE 120, and/or any other component(s) of FIG. 2 may perform one or more techniques associated with the high speed train mode, as described in more detail elsewhere. For example, controller/processor 240 of base station 110, controller/processor 280 of UE 120, and/or any other component(s) of FIG. 2 may perform or direct operations of, for example, the processes of FIGS. 6-7 and/or other processes as described. Memories 242 and 282 may store data and program codes for base station 110 and UE 120, respectively. A scheduler 246 may schedule UEs for data transmission on the downlink and/or uplink.

In some aspects, the UE 120 may include means for detecting, means for instructing, means for receiving, means for performing beam management, and means for reporting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

As described above, wireless communications may occur in scenarios where a UE is travelling on a high speed train, such as a train moving with a speed over 300 km/h. For sub-6 GHz systems (e.g., LTE, NR FR1 (new radio frequency one), etc.), the single frequency network (SFN) method is typically considered. In the SFN method, multiple TRPs transmit the same data on the same frequency and time resources, without analog beamforming.

For millimeter wave systems (e.g., NR FR2 (new radio frequency two)), a more advanced method is employed due to the use of analog beamforming. Beam management is specified for NR FR2. Beam management methods have been well developed for normal FR2 deployment scenarios. However, beam management methods for normal scenarios may not be able to be applied to the high speed train scenario. For example, analog beam determination based on beam sweeping (e.g., a current solution) may not work due to a UE's high speed.

A different type of analog beam management may be used for the HST scenario with millimeter wave communications. In other words, beam management for the high speed train scenario is not the same as beam management for the normal UE scenario. For example, beam management for the normal scenario may be based on beam sweeping. In contrast, beam management for the high speed train scenario uses predetermined beam patterns based on UE speed, for example, or using only one (or a few) fixed analog beam(s).

Figure 3:
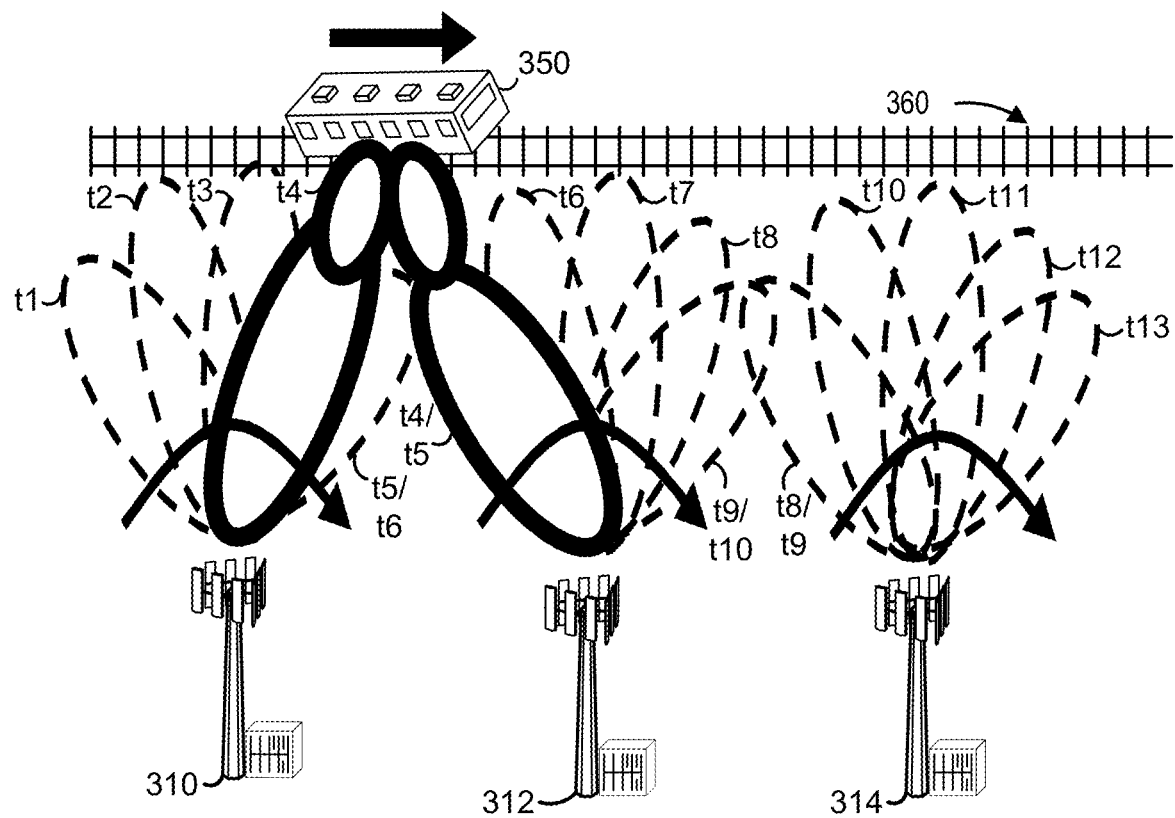
FIG. 3 is a diagram illustrating analog beam management for high speed train scenarios, according to aspects of the present disclosure.

FIG. 3 is a diagram illustrating analog beam management for high speed train scenarios, according to aspects of the present disclosure. In FIG. 3, a UE 350 is travelling on a train along a train track 360 in the direction of the arrow. A beam from a first transmit receive point (TRP) 310 sweeps from time t1 to time t5 to follow the UE 350. A beam from a second TRP 312 also sweeps to follow the UE 350 from time t5 to time t9 as it moves along the track 360. A beam from a third TRP 314 sweeps to follow the UE 350 from time t9 to time t13 as it continues to move along the track 360. In the normal mode (as opposed to a high speed train mode), there are multiple candidate beams for data transmission. Each candidate beam may be associated with a synchronization signal block (SSB) or a channel state information reference signal (CSI-RS). The TRPs 310, 312 select the best beam among candidate beams based on UE reporting.

Predetermined beam patterns may be employed in a high speed train scenario. Referring again to FIG. 3, there are multiple candidate beams for data transmission. Each candidate beam may be associated with an SSB or a CSI-RS. The TRP 310, 312 selects the best beam among candidate beams based on a predetermined rule and UE speed. For example, a predetermined rule may specify that the TRP 310 switches from the leftmost beam to the rightmost beam as time goes by. The rule specifies the switching occurs without the UE reporting signal strength associated with each beam. Other predetermined rules are also contemplated.

Figure 4:
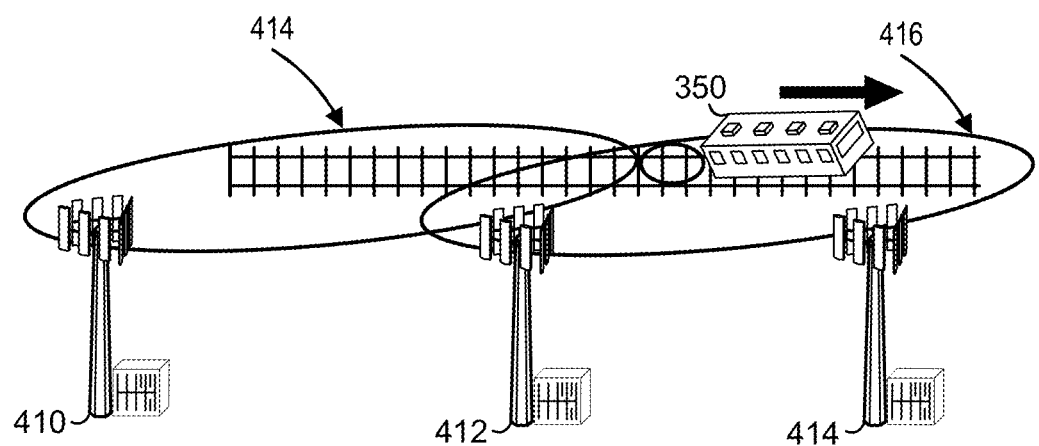
FIG. 4 is a diagram illustrating fixed beams alongside a railway, according to aspects of the present disclosure.

FIG. 4 is a diagram illustrating fixed beams alongside a railway, according to aspects of the present disclosure. In FIG. 4, a fixed analog beam 414, 416 from each TRP 410, 412 is aligned to provide coverage for the UE 350 travelling on the high speed train. In this example of beam management for the high speed train (HST) scenario, only one beam is transmitted from each TRP. There is only one candidate beam for data transmission. One candidate beam may be associated with an SSB or a CSI-RS. The gNB always uses the beam.

Different beam scenarios exist because high speed train scenarios may have different characteristics from other normal deployment scenarios. For example, remote radio heads (RRHs) or transmit receive points (TRPs) can have different layouts for the different scenarios. For the high speed train scenario, the RRHs and TRPs are generally located alongside the railway, as seen in FIGS. 3 and 4. For a normal scenario, there is no similar characteristic. For the high speed train scenario, the channels are usually line of sight (LOS) and have a high Doppler frequency. In normal scenarios, channels can be non-line of sight with a low Doppler frequency. In the high speed train scenario, the UE location and movement are predictable. In the normal scenario, this is often not the case.

Accordingly, specific procedures (including beam management) and/or configurations may be specified for the high speed train scenario. Thus, the base station and UE may switch to a specific mode for high speed trains, if the "high speed train (HST)" scenario is detected.

Aspects of the present disclosure describe how the base station and the UE detect the HST scenario. In a first aspect, the base station detects the high speed train scenario and activates the high speed train mode by informing the UE of the mode change. The base station may estimate the UE's movement (e.g., based on received uplink signals, either from one TRP or from multiple TRPs. For example, the base station can estimate the Doppler shift based on received uplink signals from one TRP (or multiple TRPs). In another example, the base station may predict the UE speed based on received uplink signals from one or multiple TRPs (e.g., two adjacent TRPs).

Once the base station determines the UE is in a high speed train scenario, the base station instructs the UE to enter the high speed train (HST) mode. The instruction may be sent via downlink control information (DCI), a media access control-control element (MAC-CE), or radio resource control (RRC) signaling. After the HST mode is activated, the base station and the UE procedures (e.g., beam management) are different from the procedures for the normal mode.

In another aspect of the present disclosure, the UE detects the high speed train scenario. After detecting the high speed train scenario, the UE reports it to the base station. Based on the UE report, the base station decides how to proceed. If appropriate, the base station activates the high speed train (HST) mode and informs the UE of the mode change.

There are a variety of ways the UE can detect the high speed train scenario. Any combination of the following options may be employed.

In a first option, received downlink signals (e.g., SSB, CSI-RS, etc.) can be analyzed. For example, Doppler shift may be measured to determine the UE speed.

In another option, a downlink signal strength may be monitored for multiple TRPs. The speed can be determined based on the change in signal strength between the two (or more) TRPs. A more detailed explanation will now be provided. In this example, SSBs are sent on different beams. Referring again to FIG. 3, the SSBs are broadcast on beams corresponding to times t1, t2, t3, t4, and t5 from a first TRP 310. The SSBs are broadcast on the beams corresponding to times t5, t6, t7, t8, and t9 for a second TRP 312. The UE 350 travelling on the high speed train track 360 averages the signal strengths from the beams on the first TRP 310. The UE 350 then compares the first TRP average signal strength to an average of the signal strengths of the signals received from the second TRP 312. The speed of the UE 350 may be determined based on how quickly the average signal strength changes between the first and second TRPs 310, 312.

Figure 5A:
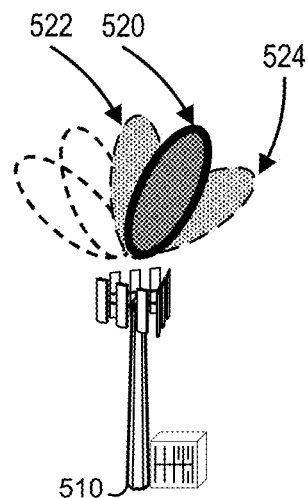
FIGS. 5A and 5B are diagrams showing different beam patterns, according to aspects of the present disclosure.
Figure 5B:
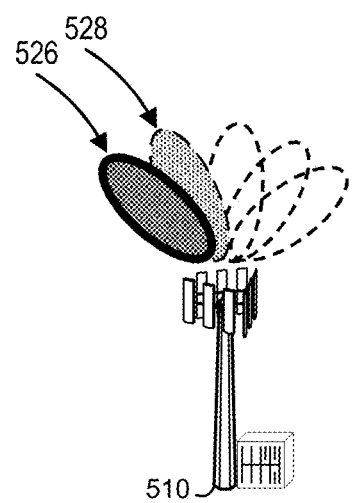

In yet another option, the UE speed can be determined based on a pattern of detected wireless links (e.g., received signal strength variation of SSBs from one or more TRPs). FIGS. 5A and 5B are diagrams showing different beam patterns, according to aspects of the present disclosure. Referring to FIG. 5A, a UE measures the SSBs sent on each beam 520-524 from a TRP 510. The signal strength from the beam 520 is the strongest, with the beams 522, 524 being somewhat weaker. If the UE was located at a different position, the signal strength pattern would be different, as seen in FIG. 5B. For example, in FIG. 5B, the signal strength of a beam 526 is stronger than a weaker beam 528. Based on a comparison of these patterns, the UE can estimate its speed. The UE could additionally consider the signal strength pattern associated with an additional TRP (e.g., the second TRP 312 of FIG. 3), to further refine the speed estimate.

In still another option, the UE may determine whether it is in a high speed train scenario with UE sensors. For example, the UE may estimate its speed based on GPS or motion/speed sensors.

In yet another option, the UE may determine it is in a high speed train scenario by recognizing application level indicators. For example, an application triggered by a user may inform the UE of the high speed train scenario. The user may turn on "Train mode" (similar to airplane mode) on the UE. In another example, the user may run a specific application designed to provide improved service on high speed trains. In each of these cases, the UE would recognize it is in the high speed train mode, based on the application level indicators.

The indication of the high speed train detection from the UE to the base station may be sent via UCI, a MAC-CE, or RRC signaling. The indication of the high speed train (HST) mode change (from the base station to the UE) may be sent via DCI, a MAC-CE, or RRC signaling.

The UE can toggle back to the normal mode when the UE leaves the high speed scenario. For example, the UE may detect it is no longer in the high speed scenario and inform the base station. The base station may then instruct the UE to return to the normal mode. Similarly, the base station may independently detect the UE is no longer in a high speed scenario and subsequently instruct the UE to enter the normal mode.

Figure 6:
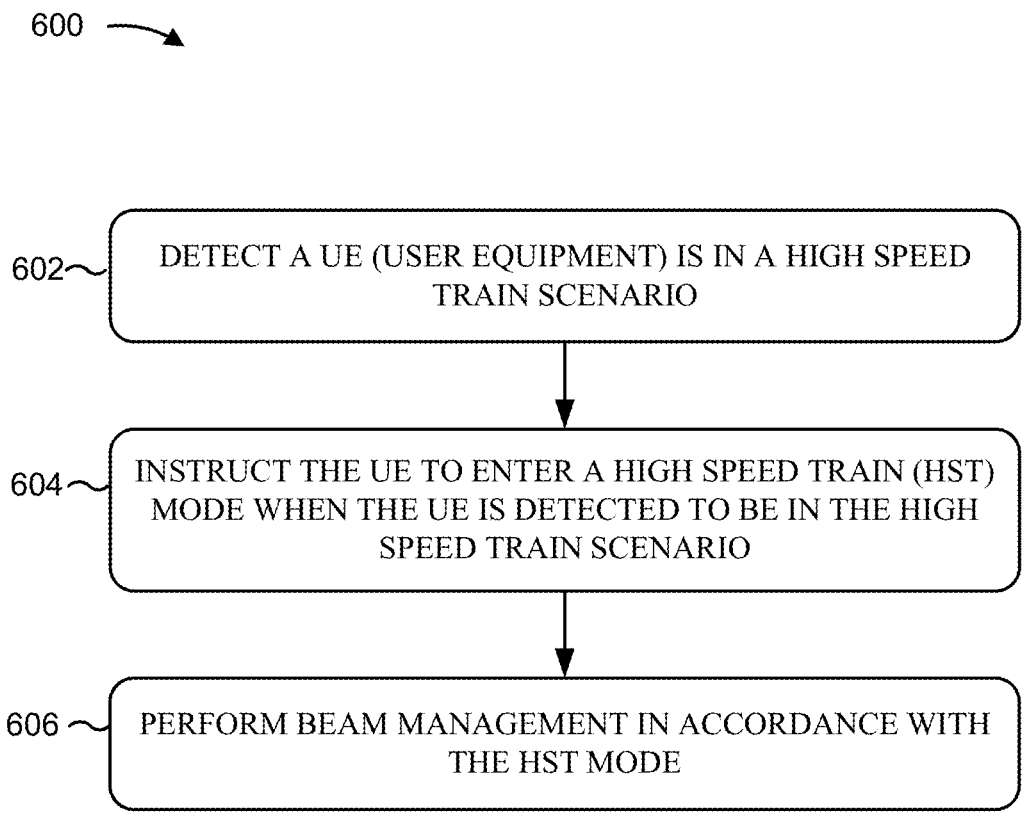
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. The example process 600 is an example of detection of a high speed train scenario and indication of high speed train (HST) mode.

As shown in FIG. 6, in some aspects, the process 600 may include detecting a UE (user equipment) is in a high speed train scenario (block 602). For example, the base station (e.g., using the antenna 234, DEMOD 232, MIMO detector 236, receive processor 238, the controller/processor 240, memory 242, and or the like) can perform the detecting.

As shown in FIG. 6, in some aspects, the process 600 may include instructing the UE to enter a high speed train (HST) mode when the UE is detected to be in the high speed train scenario (block 604). For example, the base station (e.g., using the antenna 234, MOD 232, TX MIMO processor 230, transmit processor 220, controller/processor 240, memory 242, and or the like) can instruct the UE.

As shown in FIG. 6, in some aspects, the process 600 may include performing beam management in accordance with the HST mode (block 606). For example, the base station (e.g., using the antenna 234, MOD/DEMOD 232, TX MIMO processor 230, transmit processor 220, MIMO detector 236, receive processor 238, controller/processor 240, memory 242, and or the like) can perform beam management in accordance with the HST mode.

Figure 7:
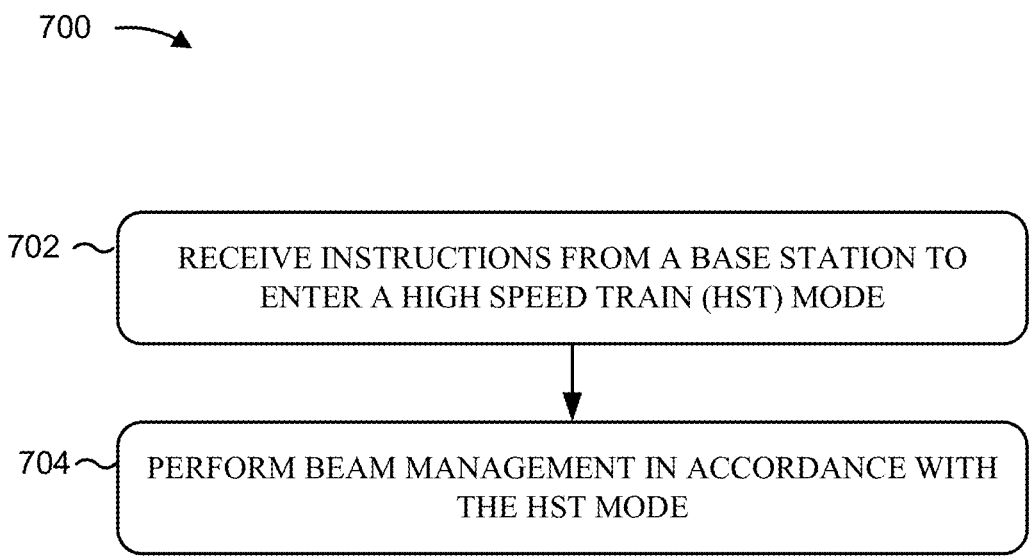
FIG. 7 is a diagram illustrating an example process performed, for example, by a user equipment (UE), in accordance with various aspects of the present disclosure.

FIG. 7 is a diagram illustrating an example process 700 performed, for example, by a UE, in accordance with various aspects of the present disclosure. The example process 700 is an example of detection of a high speed train scenario and indication of high speed train (HST) mode.

As shown in FIG. 7, in some aspects, the process 700 may include receiving instructions from a base station to enter a high speed train (HST) mode (block 702). For example, the UE (e.g., using the antenna 252, DEMOD 254, MIMO detector 256, receive processor 258, controller/processor 280, memory 282, and or the like) can receive instructions from a base station to enter a high speed train (HST) mode.

As shown in FIG. 7, in some aspects, the process 700 may include performing beam management in accordance with the HST mode (block 704). For example, the UE (e.g., using the antenna 252, MOD/DEMOD 254, TX MIMO processor 266, transmit processor 264, MIMO detector 256, receive processor 258, controller/processor 280, memory 282, and or the like) can perform beam management in accordance with the HST mode.

Implementation examples are described in the following numbered clauses:

1. A method of wireless communication for a UE (user equipment), comprising:
    receiving instructions from a base station to enter a high speed train (HST) mode; and
    performing beam management in accordance with the HST mode.
2. The method of clause 1, further comprising:
    detecting the UE is in the high speed train scenario; and
    reporting the high speed train scenario to the base station to trigger sending of the instructions.
3. The method of any of the proceeding clauses, further comprising detecting the high speed train scenario based on a measured Doppler shift for received downlink signals.
4. The method of any of the proceeding clauses, further comprising detecting the high speed train scenario based on downlink signal strength change between a plurality of transmit receive points (TRPs).
5. The method of any of the proceeding clauses, further comprising detecting the high speed train scenario based on a pattern change in downlink signals received from at least one wireless transmit receive point (TRP).
6. The method of any of the proceeding clauses, further comprising detecting the high speed train scenario based on UE sensors and/or application level indicators.
7. The method of any of the proceeding clauses, further comprising reporting the high speed train scenario via uplink control information (UCI), radio resource control (RRC) signaling, or a media access control-control element (MAC-CE).
8. The method of clause 1, in which performing beam management in accordance with the HST mode comprises selecting a beam based on UE speed and a predetermined rule.
9. The method of clause 1, further comprising returning from the HST mode to a normal mode in response to receiving instructions from the base station to enter the high speed train (HST) mode.
10. The method of clause 1, further comprising receiving the instructions via downlink control information (DCI), radio resource control (RRC) signaling, or a media access control-control element (MAC-CE).
11. A method of wireless communication by a base station, comprising:
    detecting a UE (user equipment) is in a high speed train scenario;
    instructing the UE to enter a high speed train (HST) mode when the UE is detected to be in the high speed train scenario; and
    performing beam management in accordance with the HST mode.
12. The method of clause 11, further comprising instructing the UE via downlink control information (DCI), radio resource control (RRC) signaling, or a media access control-control element (MAC-CE).
13. The method of clause 11, in which detecting is based on a received uplink signal from the UE.
14. The method of any of the clauses 11-13, further comprising detecting based on: a Doppler shift determined from uplink signals received at one or more transmit receive points (TRPs) or a predicted UE speed determined from uplink signals received at a plurality of TRPs.
15. The method of clause 11, in which the detecting comprises receiving an indication from the UE that the UE is in the high speed train scenario.
16. A base station for wireless communication, comprising:
    a memory, and
    at least one processor operatively coupled to the memory, the memory and the at least one processor configured:
        to detect a UE (user equipment) is in a high speed train scenario;
        to instruct the UE to enter a high speed train (HST) mode when the UE is detected to be in the high speed train scenario; and
        to perform beam management in accordance with the HST mode.
17. The base station of clause 16, in which the at least one processor is further configured to instruct the UE via downlink control information (DCI), radio resource control (RRC) signaling, or a media access control-control element (MAC-CE).
18. The base station of clause 16, in which the at least one processor is further configured to detect based on a received uplink signal from the UE.
19. The base station of any of the clauses 16-18, in which the at least one processor is further configured to detect based on: a Doppler shift determined from uplink signals received at one or more transmit receive points (TRPs) or a predicted UE speed determined from uplink signals received at a plurality of TRPs.
20. The base station of clause 16, in which the at least one processor is further configured to detect by receiving an indication from the UE that the UE is in the high speed train scenario.
21. A UE (user equipment) for wireless communication, comprising:
    a memory, and
    at least one processor operatively coupled to the memory, the memory and the at least one processor configured:
        to receive instructions from a base station to enter a high speed train (HST) mode; and to perform beam management in accordance with the HST mode.

22. The UE of clause 21, in which the at least one processor is further configured:
to detect the UE is in high speed train scenario; and
to report the high speed train scenario to the base station.

23. The UE of clause 21 or 22, in which the at least one processor is further configured to detect the high speed train scenario based on a measured Doppler shift of received downlink signals.

24. The UE of clause 21 or 22, in which the at least one processor is further configured to detect the high speed train scenario based on downlink signal strength change between a plurality of transmit receive points (TRPs).

25. The UE of clause 21 or 22, in which the at least one processor is further configured to detect the high speed train scenario based on a pattern change in downlink signals received from at least one wireless transmit receive point (TRP).

26. The UE of clause 21 or 22, in which the at least one processor is further configured to detect the high speed train scenario based on UE sensors and/or application level indicators.

27. The UE of clause 21 or 22, in which the at least one processor is further configured to report the high speed train scenario via uplink control information (UCI), radio resource control (RRC) signaling, or a media access control-control element (MAC-CE).

28. The UE of clause 21, in which the at least one processor is further configured to receive the instructions via downlink control information (DCI), radio resource control (RRC) signaling, or a media access control-control element (MAC-CE).

29. The UE of clause 21, in which the at least one processor is further configured to perform beam management in accordance with the HST mode by selecting a beam based on UE speed and a predetermined rule.

30. The UE of clause 21, in which the at least one processor is further configured to return from the HST mode to a normal mode in response to receiving instructions from the base station to enter the high speed train (HST) mode.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication for a UE (user equipment), comprising:
detecting the UE is in a high speed train scenario based on a rate of change between a first average downlink signal strength for signals received from a first of a plurality of transmit receive points (TRPs) and a second average downlink signal strength for signals received from a second of the plurality of (TRPs);
reporting the high speed train scenario to a base station;
receiving instructions from the base station to enter a high speed train (HST) mode based on the reporting; and
performing beam management in accordance with the HST mode.

2. The method of claim 1, further comprising detecting the high speed train scenario based on a measured Doppler shift for received downlink signals.

3. A method of wireless communication for a UE (user equipment), comprising:
detecting the UE is in a high speed train scenario based on a beam signal strength pattern change in downlink signals received from one wireless transmit receive point (TRP), the downlink signals having a beam signal strength pattern comprising a plurality of beams from the one wireless TRP, each beam of the plurality of beams having a measured signal strength that changes based on a position of the UE;
reporting the high speed train scenario to a base station;
receiving instructions from the base station to enter a high speed train (HST) mode based on the reporting; and
performing beam management in accordance with the HST mode.

4. The method of claim 1, further comprising detecting the high speed train scenario based on UE sensors and/or application level indicators.

5. The method of claim 1, further comprising reporting the high speed train scenario via uplink control information (UCI), radio resource control (RRC) signaling, or a media access control-control element (MAC-CE).

6. The method of claim 1, in which performing beam management in accordance with the HST mode comprises selecting a beam based on UE speed and a predetermined rule.

7. The method of claim 1, further comprising returning from the HST mode to a normal mode in response to receiving instructions from the base station to enter the high speed train (HST) mode.

8. The method of claim 1, further comprising receiving the instructions via downlink control information (DCI), radio resource control (RRC) signaling, or a media access control-control element (MAC-CE).

9. A UE (user equipment) for wireless communication, comprising:
   a memory, and
   at least one processor operatively coupled to the memory, the memory and the at least one processor configured:
      to detect the UE is in a high speed train scenario based on a rate of change between a first average downlink signal strength for signals received from a first of a plurality of transmit receive points (TRPs) and a second average downlink signal strength for signals received from a second of the plurality of (TRPs);
      to report the high speed train scenario to a base station;
      to receive instructions from the base station to enter a high speed train (HST) mode based on the report; and
      to perform beam management in accordance with the HST mode.

10. The UE of claim 9, in which the at least one processor is further configured to detect the high speed train scenario based on a measured Doppler shift of received downlink signals.

11. A UE (user equipment) for wireless communication, comprising:
   a memory, and
   at least one processor operatively coupled to the memory, the memory and the at least one processor configured:
      to detect a high speed train scenario based on a beam signal strength pattern change in downlink signals received from one wireless transmit receive point (TRP), the downlink signals having a beam signal strength pattern comprising a plurality of beams from the one wireless TRP, each beam of the plurality of beams having a measured signal strength that changes based on a position of the UE;
      to report the high speed train scenario to a base station;
      to receive instructions from the base station to enter a high speed train (HST) mode based on the report; and
      to perform beam management in accordance with the HST mode.

12. The UE of claim 9, in which the at least one processor is further configured to detect the high speed train scenario based on UE sensors and/or application level indicators.

13. The UE of claim 9, in which the at least one processor is further configured to report the high speed train scenario via uplink control information (UCI), radio resource control (RRC) signaling, or a media access control-control element (MAC-CE).

14. The UE of claim 9, in which the at least one processor is further configured to receive the instructions via downlink control information (DCI), radio resource control (RRC) signaling, or a media access control-control element (MAC-CE).

15. The UE of claim 9, in which the at least one processor is further configured to perform beam management in accordance with the HST mode by selecting a beam based on UE speed and a predetermined rule.

16. The UE of claim 9, in which the at least one processor is further configured to return from the HST mode to a normal mode in response to receiving instructions from the base station to enter the high speed train (HST) mode.

\* \* \* \* \*